United States Patent Office 3,664,806
Patented May 23, 1972

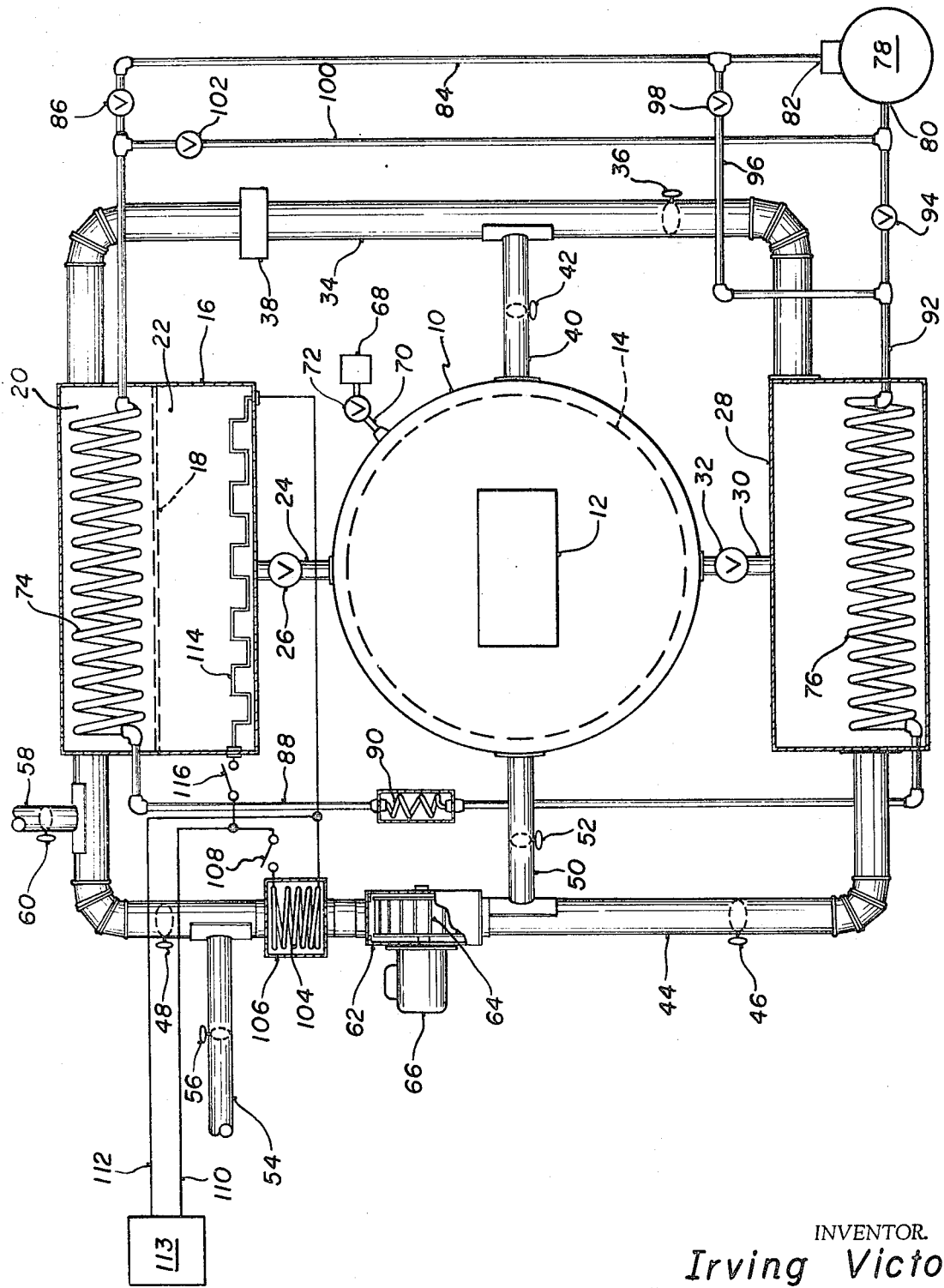

3,664,806
DRY CLEANING OF TEXTILE FIBERS AND OTHER GARMENT MATERIALS WITH CHLOROFLUORO HYDROCARBONS HAVING RELATIVELY HIGH FREEZING POINTS
Irving Victor, Minneapolis, Minn., assignor to Research Development Co., Minneapolis, Minn.
Filed Sept. 13, 1963, Ser. No. 308,772
Int. Cl. D06i 1/02, 1/10; C123g 5/02
U.S. Cl. 8—142                                    11 Claims

ABSTRACT OF THE DISCLOSURE

Process and composition for cleaning textiles and other garment materials with a chloro-fluorohydrocarbon solvent having a relatively high freezing point which produces a high quality of cleaning without injury to the textiles, and in which the solvent can be recovered through condensation and solidification at easily attainable temperatures.

---

This invention relates to improvements in the cleansing or cleaning of textiles and garment with an organic solvent that is capable of solidifying or congealing at a relatively high temperature. In general, the invention is concerned with the simplication of cleansing materials with an organic solvent by the use of a composition which may exist in a solid state in one step of the procedure, together with the necessary steps by which materials can be cleansed and in which the solvent can be economically recovered.

The prior art procedures and apparatus for cleansing materials with compositions that embody the use of an organic solvent have been relatively complex, and their complexity and cost have progressively increased with the development of the art.

Considering the dry cleaning of textiles and garments on a commercial basis, the earliest procedures involved the use of the natural liquid hydrocarbons as the cleansing solvent. The cost of these solvents was relatively low, and therefore, solvent losses were not significant, but those solvents were highly flammable, and therefore, dangerous to use. To overcome the fire and explosion hazards accompanying the use of the natural hydrocarbons, the industry turned to the use of nonflammable synthetic solvents of the class of the chlorinated hydrocarbons. Carbon tetrachloride was among the first of these solvents to come into use, and while this liquid and its vapors are nonflammable, the solvent is subject to decomposition in the presence of even small amounts of moisture which cause the formation of hydrochloric acid that attacks the textiles as well as the metal equipment. Moreover, the vapors of this solvent are highly toxic, and therefore, not safe for general industrial use. With the subsequent discovery of perchloroethylene and practical methods of making the same, the dry cleaning industry soon adopted this newer form of chlorinated hydrocarbon, and it is in wide commercial use at this time. There are, however, a number of disadvantages to the use of perchlorethylene. Because of its high boiling point and low rate of evaporation, it is necessary to use heated air to remove the solvent vapors from textile materials, thereby causing linting of the textiles. Moreover, the high solvency power of this material may cause damage to dyestuffs used in textiles and to buttons or ornaments customarily used on garments. Also, because the solvent is quite expensive, it must be recovered for re-use, thereby necessitating procedures for filtration and clarification of the liquid solvent, and additional procedures for conserving the volatilized vapors. The filtration procedures require costly equipment, and the most efficient method of conserving some of the vapors requires extensive equipment for adsorption of the vapors and the subsequent recovery of the solvent from the adsorbent.

More recently, in an effort to reduce the cost of commercial dry cleaning of textiles, there has been a substantial effort to provide self-service or "coin operated" dry cleaning units. A majority of these self-service type of units use perchlorethylene as the cleaning solvent, and in general, the procedures for cleaning textiles in these units follow those practiced in the commercial industry. In my copending application, Ser. No. 116,833, I have disclosed improved procedures for self-service dry cleaning, which among other things, embodies the use of a dry cleaning composition comprising a chloro-fluoro-hydrocarbon liquid having a relatively high evaporation rate to simplify and shorten the time required to dry clean textiles. However, because of the high volatility and high cost of fluorinated hydrocarbon liquid, relatively complex methods and apparatus are necessary to make the procedures and apparatus practical.

In the present invention, I have contemplated the use of materials, procedures and apparatus by which the dry cleaning of garment materials, can be simplified and performed in a satisfactory manner with less expensive apparatus. My invention is, in part, based on the discovery that garments and textile materials can be satisfactorily cleaned with the use of a composition comprising a solvent that has superior cleansing qualities, and which may exist in a congealed or solid form during a part of the procedure. I have found that some of the solvents of this class of compositions have exceptionally good cleansing properties, and by reason of their high congealing or freezing points, they can be more easily recovered than in the case of prior solvents. Although the evaporation rates of some of these solvents are relatively low, as compared to carbon tetrachloride, the vapors can be removed from garments or other objects with air at normal temperatures. Thus, I am able to avoid the use of any extensive amount of heat in the drying of the garments or other objects, and thereby avoid the handicaps that accompany the use of perchloroethylene in dry cleaning. Also, since the solvent can be condensed or congealed at easily attainable low temperatures, I can avoid the costly procedures and equipment necessary to purify and recover the solvent.

A particular feature of the present invention is that it simplifies dry cleaning to the extent that it makes home dry cleaning possible in apparatus comparable to home laundry equipment.

An object of this invention is to provide a relatively simple process of cleansing textile materials which embodies the use of a cleansing composition comprising an organic solvent that may be condensed and congealed or converted into a solid state at an easily attained low temperature.

Another object is to provide a method and means of dry cleaning textile materials which avoids many of the complicated procedures and equipment heretofore required with previously known solvents.

Other and further objects may become apparent from the following specification and claims, and in the appended drawings in which:

The single figure of the drawing is a schematic illustration of one form of dry cleaning apparatus in which the process of the present invention may be performed.

A highly important feature of the present invention is in the selection of an appropriate cleaning or cleansing composition having characteristics that make it appropriate for the intended uses. The composition must be composed of an organic material that forms an acceptable dry cleaning or other type of cleansing solvents, and which also have the added characteristic of a relatively high congealing or freezing point. To be acceptable as a "dry cleaning solvent," the solvent must not weaken nor shrink ordinary textile fibers, nor bleed the common dyes from such fibers. It must have the ability to remove fats and oils; it should not impart objectionable odors to textiles; and it should be non-corrosive to metals. The solvents selected for this invention have all of the desirable characteristics set forth hereinbefore, and in addition thereto, their cleaning qualities are equal to or superior to that any prior art solvent, and they are relatively non-toxic. Most important, the selected solvents all possess a relatively high congealing or freezing point.

The class of solvents with which this invention is concerned are those organic solvents having relatively high congealing or freezing points.

While there may be a number of solvents that come within this class, I have found those most desirable are certain chloro-fluorohydrocarbons which contain at least two carbon atoms, and at least two fluorine atoms to the molecule, and for practical purposes, have a freezing point not appreciably lower than the freezing point of water. The following solvents, which are suitable for the purposes of this invention, are listed, together with their boiling points and freezing points:

| | B.P., °C. | F.P., °C. |
|---|---|---|
| 1,1,2,2 tetrachloro-1,2 difluoroethane (CCl$_2$FCCl$_2$F) | 92.8 | 26.0 |
| 1,1,1,2 tetrachloro-2,2 difluoroethane (CCl$_3$CClF$_2$) | 92.0 | 42.0 |
| 1,1,1 trichloro-2,2,2 trifluoroethane (CCl$_3$CF$_3$) | 45.7 | 14.0 |
| 2,2,3 trichloro-1,1,1,3,3 penta-fluoropropane (CF$_3$CCl$_2$CF$_2$Cl) | 72.0 | −4.0 |
| 1,2,2,3,3 pentachloro-1,1,3 trifluoropropane (CF$_2$ClCCl$_2$CFCl$_2$) | 152.0 | −5.0 |

The first two of the aforementioned solvents, which are preferred, have a relatively low latent heat of fusion, in the order of 10 B.t.u.'s per pound, an evaporation rate of 35 as compared to 100 for carbon tetrachloride, and a vapor pressure of the liquified solvent at its melting point of about 1.5 pounds per square inch.

These solvents may be used alone or in a mixture with each other, but when used for the dry cleaning of textiles or garments, are admixed with a small amount of a surface active agent that may be either anionic, cationic or non-ionic. An example of an anionic surface active agent is an alkyl aryl sulphonate; an example of a cationic agent is a quaternary ammonium salt; and an example of a non-ionic agent is an alkyl aryl polyethylene ether. Any one or a mixture of these surface active agents in a small amount, not generally in excess of 2%, may be added to the solvent, either as a preliminary treatment, or during the washing operation. A small amount of water may also be present in the cleaning composition to aid in the forming of an emulsion, and ordinarily, the amount of water should likewise not exceed about 2% of the solvent, based on solvent weight.

Referring now to the drawing, is schematically illustrated one type of apparatus adaptable for dry cleaning garments according to the present invention. Reference character 10 indicates a casing provided with an access door 12. As indicated in dotted lines, within the interior of the casing is a cylinder 14, which is rotatably driven by means, not shown. Disposed above casing 10 is a container 16 within which is a perforate barrier 18 that divides the casing 16 into a cooling chamber 20 and a reservoir 22. The container 16 is operably connected to the casing 10 by a conduit 24 containing a valve 26. Disposed beneath casing 10 is another container 28 which is operably connected to casing 10 by a conduit 30 containing a valve 32. While not shown, container 16 is provided with an access opening for introducing solvent therein, and container 28 is, likewise, provided with a suitable access opening, not shown, for purposes of cleaning or removing soil from the interior of said container.

Extending between containers 16 and 28 is a duct or conduit 34 containing a control valve 36 and an appropriate lint filter 38. A conduit 40 extends between casing 10 and conduit 34 and contains a control valve 42. Also connecting containers 16 and 28 is another conduit 44 containing control valves 46, 48. A conduit 50 extends between casing 10 and conduit 44 and contains a control valve 52. Also connected into conduit 44 is an air admission conduit 54 containing a control valve 56, and an outlet conduit 58 containing a control valve 60. Disposed in conduit 44 is a fan or blower chamber 62 containing a fan 64 driven by a motor 66.

A suitable container 68 for separately adding surface active material to the solvent within casing 10 is connected to said casing by a conduit 70 containing a control valve 72.

A heat exchange system is provided to aid in the recovery of solvent, and embodies a coil 74 disposed in the cooling chamber 20 of casing 16, and a second coil 76 is provided in container 28. To provide heat exchange with respect to the coils 74, 76, there is provided a refrigerant compressor 78 driven by a motor means, not shown, and having a low pressure inlet opening 80 and a high pressure outlet opening 82. A conduit 84 containing a valve 86 extends from the high pressure outlet 82 of the compressor 78 to one end of the coil 74. A conduit 88 extends from the other end of coil 74 to one end of coil 76 and contains a flow restriction 90. A conduit 92 extends from the other end of coil 76 to the low pressure inlet 80 of compressor 78 and contains a valve 94. A high pressure by-pass 96 extends from conduit 84 to conduit 92 and contains a valve 98. Another by-pass conduit 100 extends from conduit 84 to conduit 92 and contains a control valve 102.

Another form of heat exchange used with parts of the apparatus includes a resistance heater 104 located in a chamber 106 forming a part of the conduit 44 and said heater 104 is electrically connected by a switch 108 to a pair of current conductors 110, 112, which extend from a source of power 113. Another resistance heater 114 is located in the lower portion of the reservoir 22 and is operably connected to the conductors 110, 112, and is provided with a switch 116. If desirable, a resistance heater, not shown, may be disposed in container 28.

Although the refrigeration system has been disclosed with individual valves, it is recognized that the several valves can be incorporated into a unitary structure to provide a simple reverse cycle operation of the refrigeration system. Also, although heat is supplied through the electrical resistors 104, and 114, if desired, by modification of the refrigeration system, such heat could be supplied from other coils disposed in the refrigeration system.

A typical operation of the apparatus for dry cleaning garments or the like will now be described. Assuming the reservoir 22 of the container 16 has been charged with a quantity of one of the solvents described heretofore, said solvent would be heated by the closing of switch 116, merely until the solvent was in a liquid condition. A charge of garments or other textile materials are admitted to the cylinder 14 through the door 12 of casing 10, and after the door 12 is closed, cylinder 14 is rotated by the motor means, not shown. A charge of liquid solvent is then admitted to casing 10 from the reservoir 22 by the opening of valve 26. The surface active agent, such as a detergent, may have been applied to the textiles in liquid form, as from a hand operated dispenser, before disposing the textiles within the casing 10, or this material may be added from container 68 by the opening of valve 72. The textile materials are then washed by tumbling with the cleaning composition in casing 10 for a period of time sufficient to remove the soluble and insoluble soil, whence valve 32 is opened to permit the soiled solvent to flow by gravity into the lower container 28. Thereafter, a rinsing operation may be conducted by repeating the procedure, and if desired, a surface active agent or other additive may be added with the rinse.

After the textiles have been washed and rinsed, they are dried within the casing 10 by rotating the cylinder 14 and circulating the air within the system through a closed circuit with the aid of fan 64, by opening valves 42, 52, and 48. The refrigerant system is placed in operation with the high pressure refrigerant from outlet 82, passing through conduit 96, coil 76, the restriction 90, and expanding in the coil 74, and thence returning to the compressor through conduits 84 and 100. Under these conditions, coil 74 will be a cooling heat exchanger and as the vapors of the solvent come in contact therewith, they will be condensed and congealed, or solidified on the coil. It is recognized that a build-up of solid solvent on coil 74 would eventually impede the flow of air through the cooling chamber 20, and hence, at intervals the refrigerant circuit is reversed, making coil 74 a heating heat exchanger and coil 76 a cooling heat exchanger, but such action occurs only long enough to melt the solid solvent in chamber 20, and allow the same to flow into the reservoir 22. To aid in drying the textiles, the resistance heater 104 is energized by the closing of switch 108, and normally the heater 104 will merely have the capacity to reheat the circulated air to a temperature not substantially in excess of ambient, or merely to compensate for the cooling effect of coil 74. As a final operation, the heater 104 may be de-energized and ambient air drawn into the system through the air inlet 54 by the opening of valve 56, and such air exhausted through conduit 58 by the opening of valve 60.

To recover relatively pure solvent from the soiled mixture within the container 28, valves 36 and 46 are opened with valves 42 and 52 closed, and the gases are again circulated through the closed circuit with the aid of fan 64, whence the solvent is rectified and transferred in vapor form to the cooling chamber 20. By reversing the cycle of the refrigerant system, the solid solvent collected on the coil 74 may be periodically melted, causing it to flow into the reservoir 22 in the manner previously described.

Representative examples illustrating cleaning and recovery tests follow:

EXAMPLE I

Samples of various forms of textile and garment materials composed of wool, cotton and "Dacron" (synthetic polyester fibers) were immersed in 1,1,2,2 tetrachlor-1,2 difluoroethane. This solvent, at room temperature (22° C.), was in a solid state and was, therefore, heated to a temperature of approximately 30° C. in order to convert it to a liquid state for washing purposes. The textiles were agitated in the solvent for 15 minutes, after which the free liquid solvent was removed. The textiles were rinsed in clean solvent, and after removal thereof, air at ambient temperature was passed through the container until the fabrics were dried. The air-vapor mixture coming from the container was passed into contact with a condensing coil cooled to 5° C., and at this temperature, the solvent solidified on the condenser surface, and the air leaving the condenser bore only a faint trace of solvent vapor.

The garment materials cleaned in the manner described were compared for cleaning capacity with identical samples of garment and textile materials washed with perchlorethylene. In all instances, the soil removal capacity and soil redeposition prevention capacity of the chloro-fluorohydrocarbon were equal to or superior to those obtained with perchlorethylene.

EXAMPLE II

The test described in Example I was repeated, but in these tests, the soiled garment materials were pretreated by spraying onto soiled or spotted surfaces of the textiles a water solution of an alkyl aryl sulphonate. The degree of cleaning obtained was comparable to the results of Example I, and in addition thereto, the spots on the garment materials were removed.

EXAMPLE III

The tests described in Examples I and II were repeated, 1,1,1,2-tetrachlor-2,2 difluoroethane. The solvent was in a solid state at room temperature (22° C.), and was heated to 49° C. to melt the solvent and conduct the cleansing operations. Air at ambient temperature was used to dry the textile materials, and it was observed that some of the solvent had congealed on the textiles before removal from the washing container. When these textile materials were exposed at room temperature, the remaining solvent sublimed. The cleansing quality of this solvent was compared with results obtained with perchlorethylene at room temperature, and at the same elevated temperature. At room temperature, the cleansing quality of the chloro-fluorohydrocarbon was comparable to the results previously reported in connection with Example I, but when comparable tests were made at an elevated temperature, it was found that perchlorethylene was more damaging to fabrics containing fugitive dyes.

The principal advantages in the present invention are in the provision of effective and relatively simple means for cleansing or dry cleaning materials.

Another highly important advantage is that this invention makes home dry cleaning possible with procedures and equipment which are comparable to home laundering procedures and equipment.

The solvents and cleaning compositions have good soil removal qualities, and are non-flammable, relatively non-toxic, and therefore, quite safe to handle. Should spillage occur onto a floor surface whose temperature is below the freezing or congealing point of the solvent, such solvent will quickly solidify and can be easily recovered or removed.

Although a portion of the invention has been disclosed in connection with a type of apparatus that would form a home dry cleaning appliance, it should be understood that the disclosure is not intended as a limitation, and the invention is equally applicable to commercial use.

The invention is defined in the terms of the appended claims.

I claim:

1. A process of dry cleaning textiles and other garment materials by washing said materials in a dry cleaning solvent consisting essentially of a chlorofluoro hydrocarbon having a freezing point in the range of −5° C. to +42° C., by maintaining said solvent in a liquid state during washing, and after the materials are cleansed, evaporating the solvent and passing the resulting vapors into continuous contact with a confined surface which is cooled to a degree sufficient to condense and congeal substantially all of said solvent from said vapors.

2. The process of claim 1, wherein said solvent is 1,1,2,2-tetrachloro-1,2-difluoroethane.

3. The process of claim 1, wherein said solvent is 1,1,1,2-tetrachloro-2,2-difluoroethane.

4. The process of claim 1, wherein said solvent is 1,1,1-trichloro-2,2,2-trifluoroethane.

5. The process of claim 1, wherein said solvent is 2,2,3-trichloro-1,1,1,3,3-pentafluoropropane.

6. The process of claim 1, wherein said solvent is 1,2,2,3,3-pentachloro-1,1,3-trifluoropropane.

7. A process of dry cleaning textiles and other garment materials which comprises immersing the material in a chloro-fluoroethane having a freezing point in the range of 26° C. to 42° C. to which a surface active agent had been added.

8. The process of claim 7, wherein said solvent is 1,1,2,2-tetrachloro-1,2-difluoroethane.

9. The process of claim 7, wherein said solvent is 1,1,1,2-tetrachloro-2,2-difluoroethane.

10. A dry cleaning composition consisting essentially of 2,2,3-trichloro-1,1,1,3,3-pentafluoropropane.

11. A dry cleaning composition consisting essentially of 1,2,2,3,3-pentachloro-1,1,3-trifluoropropane.

References Cited
UNITED STATES PATENTS

| | | |
|---|---|---|
| 2,748,084 | 5/1956 | De Lew et al. |
| 2,639,599 | 5/1953 | Wellford _____ 68—182 |
| 3,042,479 | 7/1962 | Lawrence et al. _____ 8—142 |
| 3,238,011 | 3/1966 | Lawrence et al. _____ 8—142 |

GEORGE F. LESMES, Primary Examiner

J. CANNON, Assistant Examiner

U.S. Cl. X.R.

34—105, 109, 120; 68—18 C; 134—12, 32, 40; 252—364, 171, 172